(12) United States Patent
Furuya et al.

(10) Patent No.: US 9,406,920 B2
(45) Date of Patent: Aug. 2, 2016

(54) ELECTRICAL CONNECTOR AND FUEL CELL

(71) Applicants: Tyco Electronics Japan G.K., Kanagawa-ken (JP); Toyota Jidosha Kabushiki Kaisha, Aichi-ken (JP)

(72) Inventors: Sumiyoshi Furuya, Kanagawa-ken (JP); Norishige Konno, Aichi-ken (JP); Sogo Goto, Miyoshi (JP)

(73) Assignees: Toyota Jidosha Kabushiki Kaisha, Aichi-ken (JP); Tyco Electronics Japan G.K., Kanagawa-ken (JP)

( * ) Notice: Subject to any disclaimer, the term of this patent is extended or adjusted under 35 U.S.C. 154(b) by 0 days.

(21) Appl. No.: 13/780,752

(22) Filed: Feb. 28, 2013

(65) Prior Publication Data

US 2013/0236805 A1    Sep. 12, 2013

(30) Foreign Application Priority Data

Mar. 8, 2012   (JP) .................................. 2012-051391

(51) Int. Cl.
*H01M 8/24* (2006.01)
*H01M 2/20* (2006.01)
*H01M 8/02* (2016.01)
*H01R 13/627* (2006.01)
*H01R 24/20* (2011.01)

(52) U.S. Cl.
CPC .............. *H01M 2/202* (2013.01); *H01M 2/204* (2013.01); *H01M 2/206* (2013.01); *H01M 8/0202* (2013.01); *H01M 8/0247* (2013.01); *H01M 8/2465* (2013.01); *H01R 13/627* (2013.01); *H01R 24/20* (2013.01); *H01R 2201/26* (2013.01); *Y02E 60/50* (2013.01)

(58) Field of Classification Search
CPC .......................... H01M 8/2465; H01M 8/0202
USPC ........................................................ 429/452
See application file for complete search history.

(56) References Cited

U.S. PATENT DOCUMENTS

2008/0146046 A1*   6/2008   Minich ........................... 439/55

FOREIGN PATENT DOCUMENTS

| JP | 2004087163 A | | 3/2004 |
| JP | 2007-200632 | | 8/2007 |
| JP | 2010010011 A | * | 1/2010 |

OTHER PUBLICATIONS

Abstract of JP2004087163A, dated Mar. 18, 2004, 2 pages.

* cited by examiner

*Primary Examiner* — Jane Rhee
(74) *Attorney, Agent, or Firm* — Barley Snyder

(57) ABSTRACT

A connector includes a housing for holding connector terminals and a side fitting slot located at a side of the housing. The side fitting slot is defined by an arm provided on the housing and receives a mating part to which the connector terminals are connected when the mating part is inserted in the side fitting slot.

8 Claims, 5 Drawing Sheets

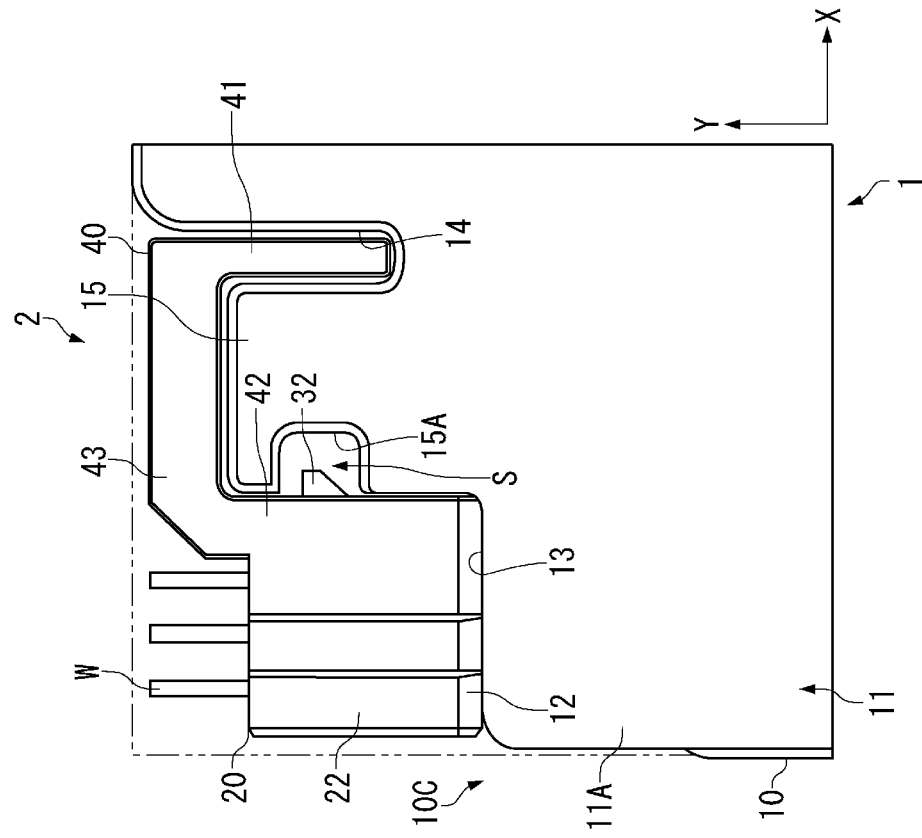
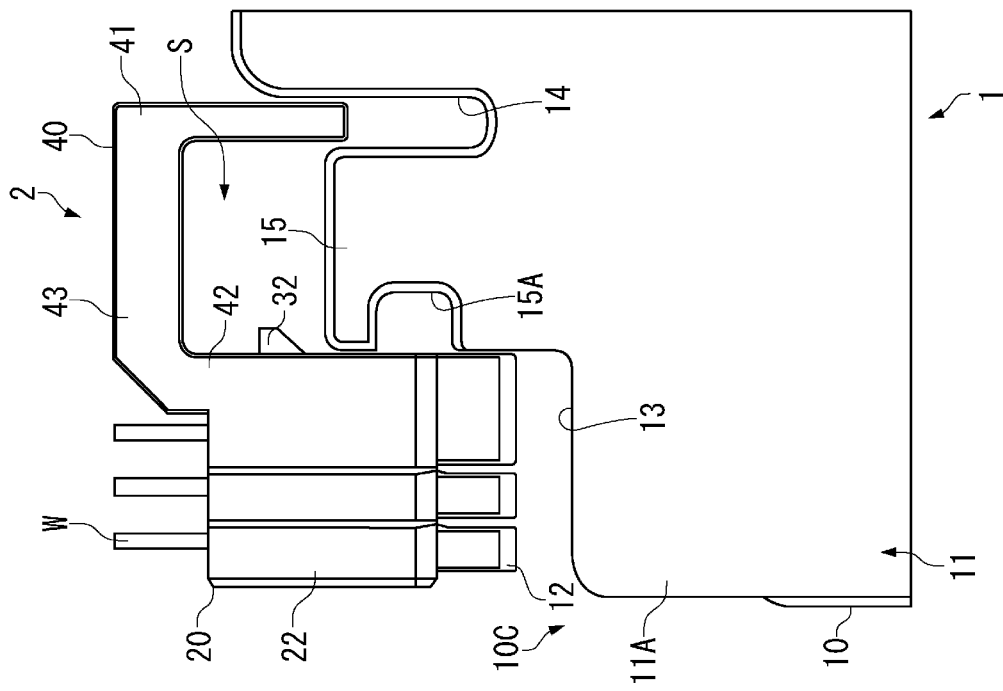

ELECTRICAL CONNECTOR AND FUEL CELL

CROSS-REFERENCE TO RELATED APPLICATIONS

This application claims the benefit of the filing date under 35 U.S.C. §119(a)-(d) of Japanese Patent Application No. 2012-051391 filed on Mar. 8, 2012.

FIELD OF THE INVENTION

The present invention relates to a fitting mode of an electrical connector.

BACKGROUND

There are many pieces of electrical equipment that are provided with a fitting slot in which an electrical connector (hereinafter, referred to as a "connector") is fitted. This fitting slot is typically formed into a frame shape around the connector in a case or the like of the equipment.

In a fuel cell having many stacked cells as well, the fitting slot is provided, (see Japanese Patent Laid-Open No. 2007-200632). In the fuel cell disclosed in Japanese Patent Laid-Open No. 2007-200632, by forming an L-shaped support part (64) on the upper surface (H) of the fuel cell, a portion between the upper surface of fuel cell and the support part forms the fitting slot. This fitting slot is formed in a pair at both ends of the upper surface and the paired fitting slots are directed to the center in the width direction of the fuel cell. The connector is inserted into the fitting slot from the center side in the width direction of the fuel cell toward the end portion.

The above-described fitting mode of the connector sometimes restricts the equipment design. That is, the mating equipment is required to have a slot member for fitting the connector and the shapes and arrangements of the members of the mating equipment are restricted because the slot member occupies a part of the equipment.

Moreover, the procurement, fabrication, and assembly of the slot member add cost.

In Japanese Patent Laid-Open No. 2007-200632 as well, the fitting slot sometimes restricts the design of fuel cell as a mating equipment. In Japanese Patent Laid-Open No. 2007-200632, a space is left between the support parts each protruding from the upper surface of fuel cell. Since this space is necessary when the fitting work is performed, cells and other elements of the fuel cell cannot be accommodated in this space portion.

SUMMARY

The present invention has been made to solve the above problems and, accordingly, an object thereof is to provide an electrical connector that does not require a mating equipment to which the connector is fitted to have a slot member.

An electrical connector, according to the present invention, includes a housing having a slot that is located at a side of the housing, defined by an arm provided on the housing, and adapted to receive a mating member. This electrical connector also has a terminal mounted to the housing and adapted for connection to the mating member when the mating member is received in the slot.

BRIEF DESCRIPTION OF THE DRAWINGS

FIGS. 5A and 5B are side views showing a procedure for fitting the FIG. 1 electrical connector to a fuel cell.

DETAILED DESCRIPTION OF THE EMBODIMENTS

The present invention will now be described in detail based on an embodiment shown in the accompanying drawings.

Figure 1:
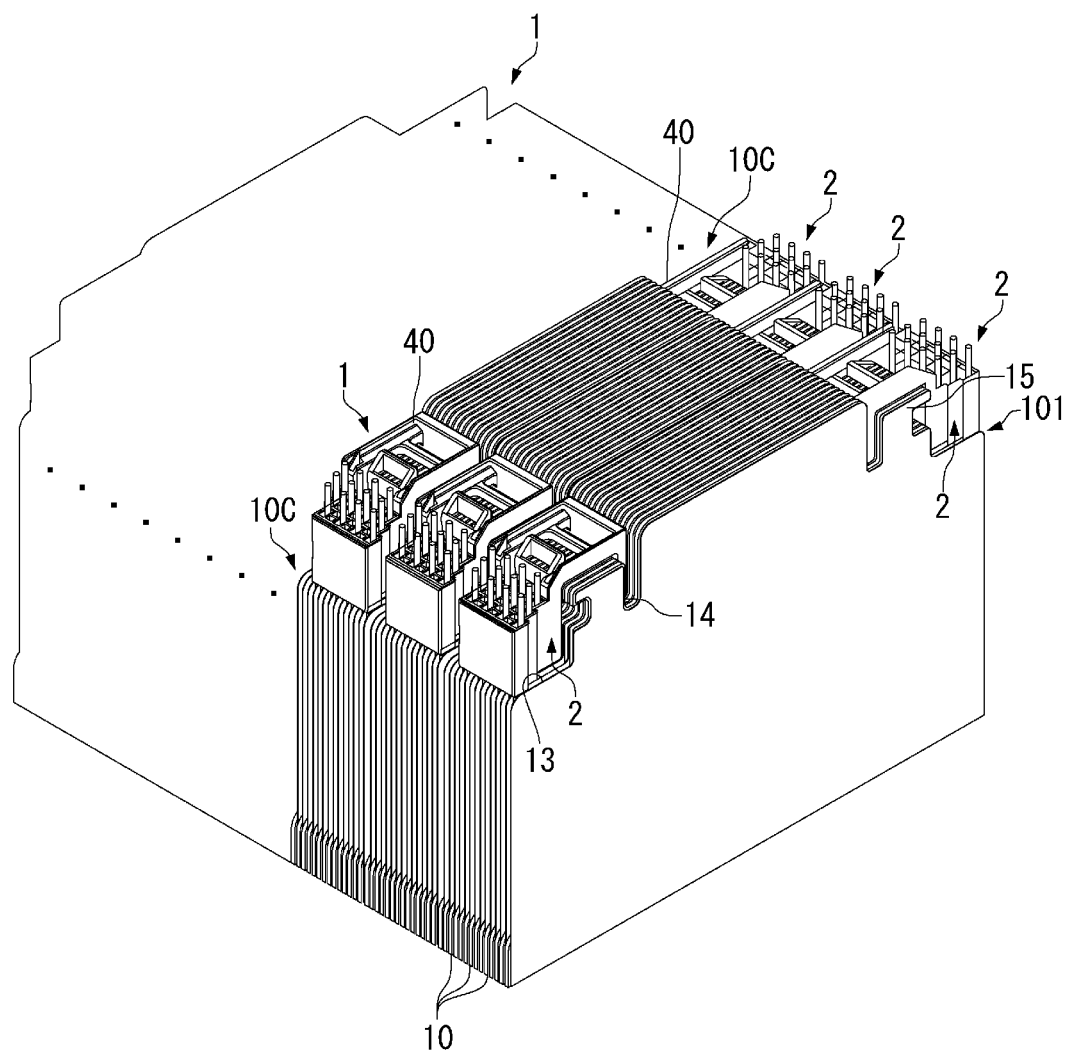
FIG. 1 is a perspective view showing a state in which an electrical connector in accordance with an embodiment of the present invention is fitted to a fuel cell.

A fuel cell 1 shown in FIG. 1 includes many flat plate-shaped cells 10 stacked at predetermined pitches and formed into a substantially rectangular form.

To control the supply amounts of fuel gas and oxidant gas based on the power generating voltage of each cell 10 or to make inspection for finding a defective cell, the fuel cell 1 is connected to a control unit or an inspection system via an electrical connector (hereinafter, referred to as a "connector") 2 that causes conduction to the plurality of cells 10 all at once. This connector 2 is fitted to a corner part 10C of the fuel cell 1.

Each of the cells 10 includes an electrolyte membrane, an anode provided on one surface side of the electrolyte membrane, and a cathode provided on the other surface side of the electrolyte membrane, and is formed into a substantially rectangular shape in plan view. The electrolyte membrane, anode, and cathode are not shown in the drawings. Further, each cell 10 includes a pair of separators 11 for holding the anode and cathode therebetween.

As described above, each cell 10 has the electrolyte membrane, anode, cathode, and the pair of separators 11 as configuration units; however, the cells 10 arranged adjacent to each other use the separators 11 in common.

To make the amount of power generation of the cell 10 large, the cell 10 is provided with a continuous region having a large area.

However, as shown most clearly in FIG. 5A and FIG. 5B, a corner part 10C to which the connector 2 is connected is offset in the width direction (X direction in FIG. 5B) and in the height direction (Y direction in FIG. 5B) of the fuel cell 1 with respect to an imaginary cell region (indicated by a two-dot chain line in FIG. 5B) having a rectangular shape in plan view.

Each separator 11 has a passage for supplying fuel gas, such as hydrogen gas, to the anode and a passage for supplying oxidant gas, such as oxygen gas, to the cathode. Each separator 11 separates the adjacent cells 10 from each other. The separators 11 extend into L-shaped notches 10L of the cells 10 formed in the corner part 10C (the cell 10 described herein means the electrolyte membrane, anode, and cathode) form cell electrodes 11A.

The corner part 10C of the fuel cell has a support part 13 for supporting a housing 20 of the connector 2. A fitting convex part 15 is adjacent to the support part 13 at the center side in the width direction of the fuel cell 1.

The support part 13 is formed by the upper end portion of the cell electrode 11A and is offset with respect to an upper surface U1 of the fuel cell 1. The offset amount from the upper surface U1 to the support part 13 is set considering the height of the connector 2.

The fitting convex part 15 protrudes in the height direction beyond the support part 13. An upper surface U2 of the fitting convex part 15 is higher than the support part 13, but is offset with respect to the upper surface U1 of the fuel cell 1. The offset amount from the upper surface U1 to the upper surface U2 is set considering the height of a connecting beam 43 (described below) of the connector 2.

To form the fitting convex part 15, a locking groove 14 is formed adjacent to the fitting convex part 15. The locking groove 14 is provided so as to have a predetermined depth from the upper surface U1. This depth is set considering the height of a locking wall 41 (described below) of the connector 2 that is inserted into the locking groove 14.

Further, the fitting convex part 15 is formed with a lock groove 15A recessed from the side face on the support part 13 side toward the locking groove 14 side.

All of the support part 13, the locking groove 14, the fitting convex part 15, and the lock groove 15A are formed continuously in the stacking direction of the cell 10 and all of the cells 10 have the same shape. By forming the support part 13, the locking groove 14, the fitting convex part 15, and the lock groove 15A, in the corner part 10C, each cell 10 has a shape complementary to the shape of the connector 2.

The connector 2 includes the housing 20 for holding a plurality of connector terminals 12 each connected electrically to a cell electrode 11A. Connector 2 has a side fitting slot S located at the side of the housing 20. The side fitting slot S is defined by a U-shaped arm 40 formed integrally with the housing 20. An electric wire W, connected to each connector terminal 12, is connected to an external circuit board.

The following explanation is given by defining the side on which the connector 2 is fitted to the fuel cell 1 as the front end side of the connector 2 and the opposite side (the side from which the electric wire W is drawn out) as the rear end side of the connector 2.

Figure 4:
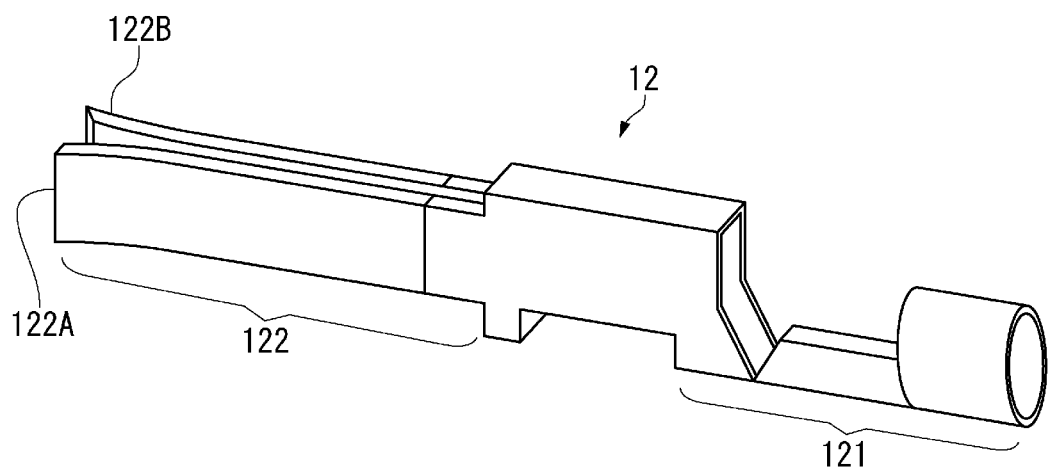
FIG. 4 is a perspective view of a terminal of the FIG. 1 connector.

As shown in FIG. 4, the connector terminal 12 is configured so as to include an electric wire mounting part 121 for connecting the electric wire W and a conducting part 122 connected to a cell electrode 11A of the cells 10 of the fuel cell 1.

The conducting part 122 is configured so as to include two contact parts 122A and 122B, each having a thin rectangular strip shape, that are opposed to each other. The front end portions of the contact parts 122A and 122B are curved in the direction such that the front end portions separate from each other, so that the cell electrode 11A can be led to between the contact parts 122A and 122B and can easily be held therebetween.

Figure 2:
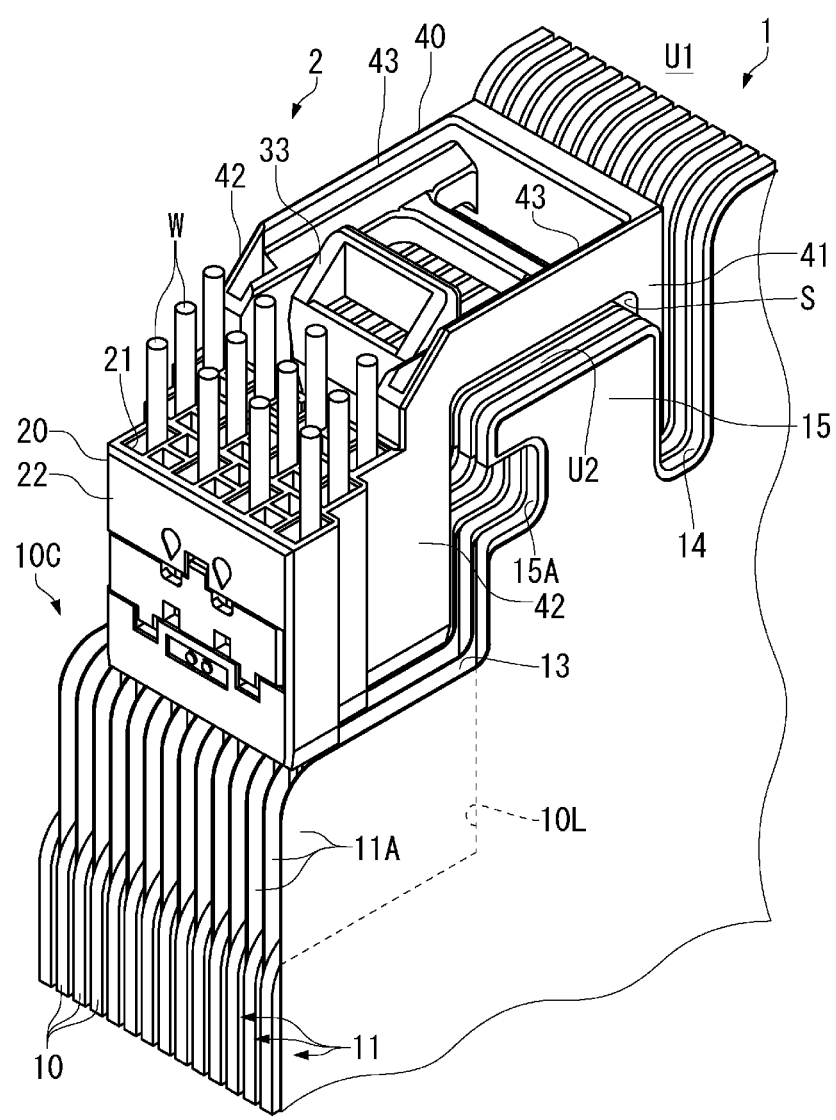
FIG. 2 is an enlarged view of an essential portion of FIG. 1, showing a corner part of a fuel cell and the electrical connector.

The housing 20 includes a cavity block 22 formed with a plurality of cavities 21 in which connector terminals 12 are mounted to housing 12 as shown in FIG. 2 and a lock member 30 that locks housing 20 to the fuel cell 1.

The cavities 21 are arranged in three rows along the stacking direction of the cells 10 and the rows of the cavities are arranged in an offset manner. This arrangement prevents the connector terminals 12 mounted to housing 12 and connected to the cell electrodes 11A adjoining at narrow pitches from interfering with each other.

With the offset arrangement of the cavities 21, the side surface portion of the cavity block 22 is made in a step form in the stacking direction of the cells 10. By combining the side surface portions of the cavity blocks 22 of adjacent connectors 2 in an offset form, the connectors 2 can be arranged without a gap therebetween in the stacking direction of the cells 10 and be connected to the cells 10.

Figure 3:
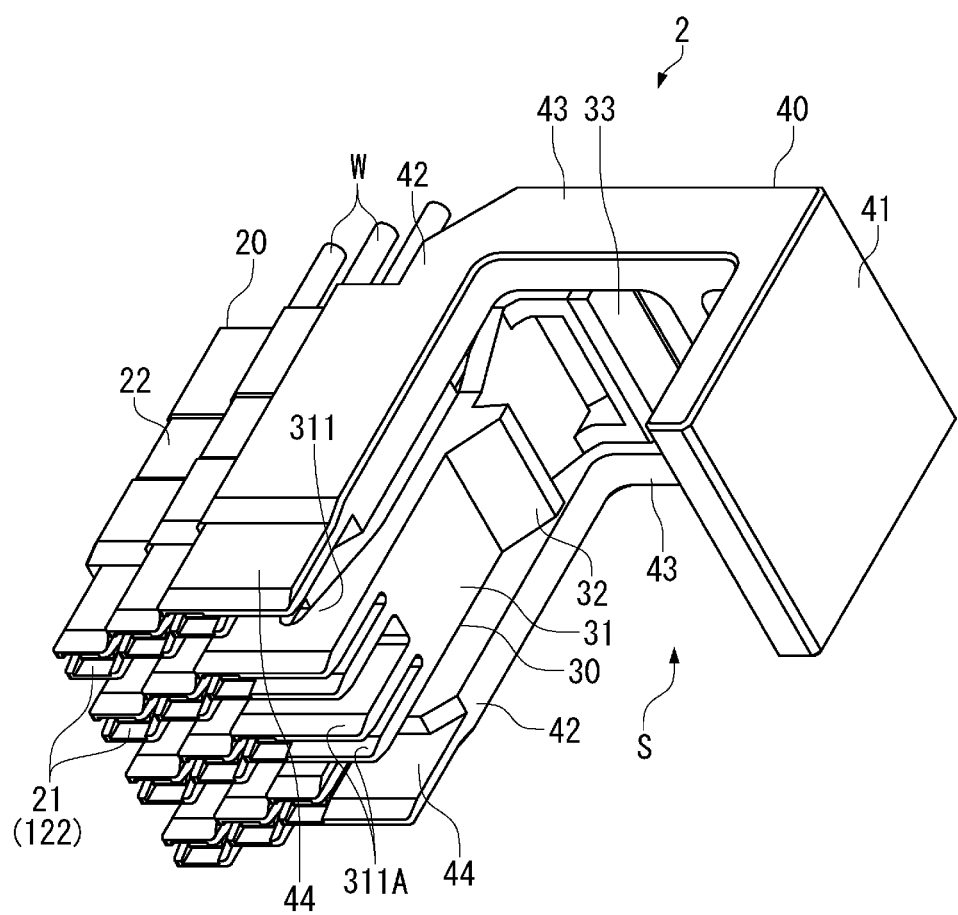
FIG. 3 is a perspective view of the FIG. 1 electrical connector.

As shown in FIG. 3, the lock member 30 has an elastic beam 31 provided on the cavity block 22, a lock protrusion 32 provided on the elastic beam 31, and an unlocking knob 33 continuous with the rear end side of the elastic beam 31.

The elastic beam 31 extends from a support end 311 provided on the front end side of the cavity block 22 toward the rear end side along the side surface of the cavity block 22. This elastic beam 31 is formed so as to have a width narrower than the width of the side surface of the cavity block 22.

The support end 311 of the elastic beam 31 is formed into a comb-teeth form by the formation of a plurality of slits 311A. The slits 311A extend toward the front end of the connector terminal 12 and the cell electrodes 11A are inserted into the slits 311A.

The lock protrusion 32, located between the front end and the rear end of the elastic beam 31, extends from the elastic beam 31 toward the side fitting slot S and has substantially the same width as that of the elastic beam 31.

The unlocking knob 33 is formed so as to be bent with respect to the rear end of the elastic beam 31.

The U-shaped arm 40 that defines slot S includes the connecting beams 43 that extend from the rear end side of the housing 20 toward the side, the locking wall 41 bent from the distal ends of the connecting beams 43 toward the front end, and pillars 42 integral with the side surface portion of the cavity block 22 so as to face to the locking wall 41.

The locking wall 41 is in a plate shape and has substantially the same width as that of the cavity block 22.

The pillars 42 are provided as a pair to hold the elastic beam 31 of the lock member 30 therebetween. Each of the pillars 42 extends from a position at which the pillar 42 faces the support end 311 of the elastic beam 31 to a position at which the pillar 42 faces the unlocking knob 33. The front end portion of the pillar 42 forms a fitting guide 44.

The connecting beams 43 are provided in a pair to be continuous with the rear end side of each of the paired pillars 42. The unlocking knob 33 is disposed between the connecting beams 43.

When the connector 2 is fitted to the fuel cell 1, as shown in FIG. 5A, the connector 2 is brought close to the corner part 10C of the fuel cell 1 from the upside in FIG. 5A. At this time, the connector 2 is positioned with respect to the fuel cell 1 so that the fitting convex part 15 fits in the side fitting slot S with the front ends of the pillars 42 and the front end of the lock member 30 being a guide for this positioning of the connector 2 relative to fuel cell 1. Thereafter, the connector 2 is pushed in toward the fuel cell 1.

As shown in FIG. 5B, when the fitting convex part 15 is fitted to the inner portion of the side fitting slot S on the inside of the arm 40, the housing 20 is supported by the support part 13. The locking wall 41 of the arm 40 is inserted into the locking groove 14 in the fuel cell 1.

In the above-described assembly process, because the lock protrusion 32 comes into contact with the fitting convex part 15 and is pushed by the fitting convex part 15, the elastic beam 31 deflects in the counterclockwise direction in FIG. 5A. Thereafter, when the lock protrusion 32 reaches the lock groove 15A, the elastic beam 31 is returned to its original position and the lock protrusion 32 fits in the lock groove 15A and the connector 2 is prevented from separating from the fuel cell 1. On the front end side of the housing 20, when the connector terminals 12 are guided with respect to the cell electrodes 11A by the slits 311A in the lock member 30 and the fitting guides 44, the connector terminals 12 hold the cell electrodes 11A therebetween and the connector terminals 12 are connected to the cell electrodes 11A.

When the fitting of the connector 2 to the fuel cell is unlocked, by pressing the unlocking knob 33 in the clockwise direction in FIG. 5B, the lock protrusion 32 is caused to come out of the lock groove 15A, so that the connector 2 can be removed toward the upside of the fuel cell 1.

In the embodiment of the present invention described above, the fuel cell does not require a fitting slot that has been provided conventionally to fit the connector 2 to the fuel cell. This achieves the effects described below in addition to the advantage that the cost involved by the provision of fitting slot can be saved.

In the embodiment of the present invention that has been described, because the connector 2 is fitted to the fuel cell 1 in the corner part 10C that is offset from other regions of the fuel cell 1, elements necessary for the fuel cell 1 can be efficiently arranged in the regions other than the corner part 10C, thereby improving the flexibility in designing the fuel cell 1. As a result, the areas occupied by the cells 10 can be kept large, thereby enhancing the performance of the fuel cell 1 without increasing the vertical and horizontal sizes of the cells 10. The above-described effects are realized by providing the side fitting slot S at the side of the connector 2.

Also, according to this embodiment of the present invention, because the connector 2 is arranged in the offset corner part 10C, the external shape of the fuel cell 1 to which the connector 2 is mounted can be made a rectangular shape without a protruding portion. Therefore, as compared to where the protruding portion is present, the flexibility in designing the fuel cell installation part in equipment (for example, a vehicle) in which the fuel cell 1 is to be disposed increases.

Moreover, in this embodiment of the present invention, because the elastic beam 31 and the lock protrusion 32 are arranged on the inside of the arm 40 of the connector 2, the electric wire W, a jig for wiring work, or the like are less liable to come into contact with or be caught by the elastic beam 31 and the lock protrusion 32. Therefore, the elastic beam 31 and the lock protrusion 32 are protected against deformation or breakage.

Further, because the connecting beams 43 of the arm 40 are provided so as to hold the unlocking knob 33 therebetween, the unlocking knob 33 is also protected against deformation or breakage.

Still further, because the connector 2 is locked to the fuel cell 1 in the direction intersecting with the stacking direction of the cells 10 to hold the fitting convex part 15 by the locking wall 41 and the pillars 42 of the arm 40, there is no need, for example, to provide a groove or protrusion for locking only to the second to eighth cell 10 from the end in the stacking direction of the fuel cell 1. Thus, the shapes of all the cells 10 can be made the same, thereby reducing the cost of the fuel cell 1.

In the above-described embodiment of the present invention, the lock member 30 is provided on the housing 20. However, the lock member can also be provided on the locking wall 41 of the arm 40. In the present invention, the provision of a lock member and the position of the lock member, if being provided, are optional.

The configurations described above in connection with the embodiment of the present invention illustrated in the drawings can be selected or changed as appropriate to other configurations without departing from the spirit and scope of the present invention.

What is claimed is:

1. An electrical connector comprising:
   a housing for holding a terminal;
   a side fitting slot located at a side of the housing, and being defined by an arm having a connecting beam extending substantially perpendicular and continuously from the housing, and a locking wall extending substantially perpendicular from a distal end of the connecting beam, such that the shape of the side fitting slot is complementary to a mating member, and
   a lock member provided on the housing so as to face the side fitting slot, the lock member preventing the electrical connector from coming off the mating member;
   wherein the electrical connector is fitted to a fuel cell having a plurality of stacked cells.

2. The electrical connector according to claim 1, wherein the arm is formed into a U shape.

3. A fuel cell which includes a plurality of stacked cells and to which the electrical connector described in claim 1 is fitted, wherein the electrical connector is fitted to a corner part of the fuel cell.

4. The fuel cell according to claim 3, wherein in the corner part, the cell has a shape such as to be cut along the shape of the electrical connector.

5. An electrical connector comprising:
   a housing having a slot:
   (a) located at a side of the housing,
   (b) defined by an arm provided on the housing, and
   (c) adapted to receive a mating member, the mating member being a fuel cell having a plurality of stacked cells, and
   a lock member facing the slot in the housing for preventing the housing from separating from the mating member; and
   a terminal mounted to the housing and having a first end connected to the mating member when the mating member is received in the slot, and a second end connected an electric wire.

6. The electrical connector according to claim 5, wherein the arm has a U shape form.

7. The electrical connector according to claim 5, wherein a portion of the housing receives a corner part of the fuel cell.

8. The electrical connector according to claim 7, wherein the shape of the portion of the housing that receives the corner part of the fuel cell and the shape of the corner part of the fuel cell are complementary.

* * * * *